H. C. EVELYN.
AUTOMOBILE HORN.
APPLICATION FILED APR. 4, 1912.
1,059,447.
Patented Apr. 22, 1913.
2 SHEETS—SHEET 1.
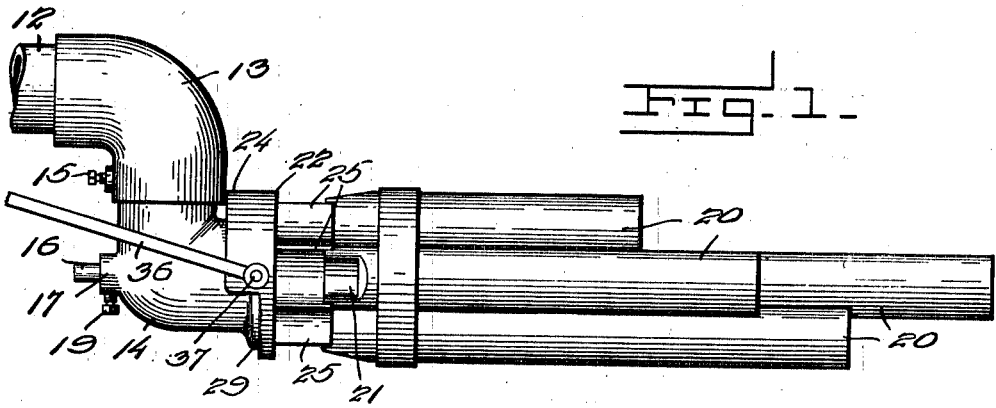
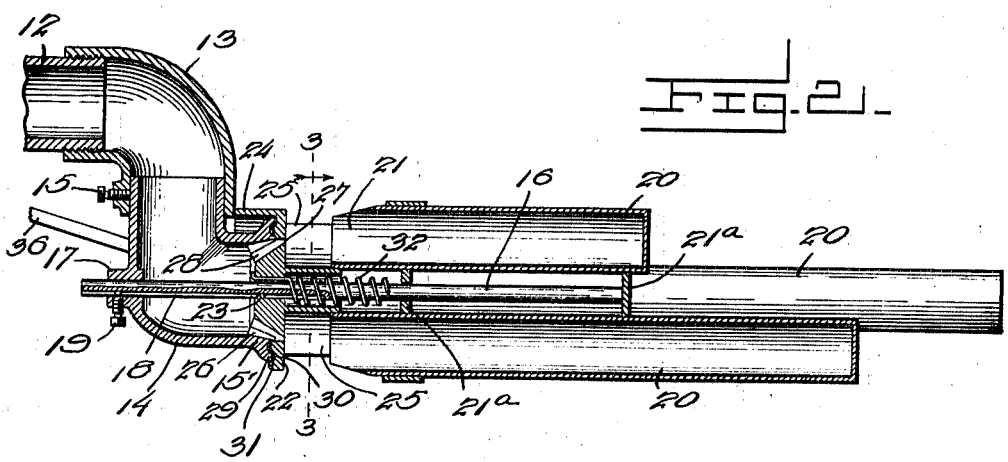
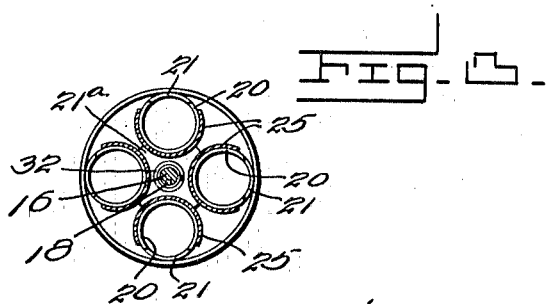

H. C. EVELYN.
AUTOMOBILE HORN.
APPLICATION FILED APR. 4, 1912.
1,059,447.
Patented Apr. 22, 1913.
2 SHEETS—SHEET 2.
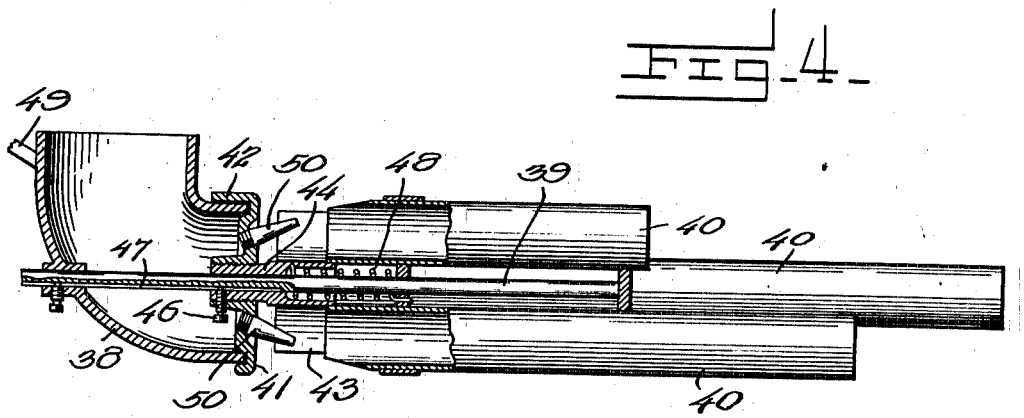
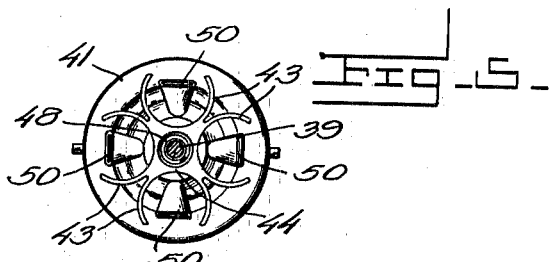
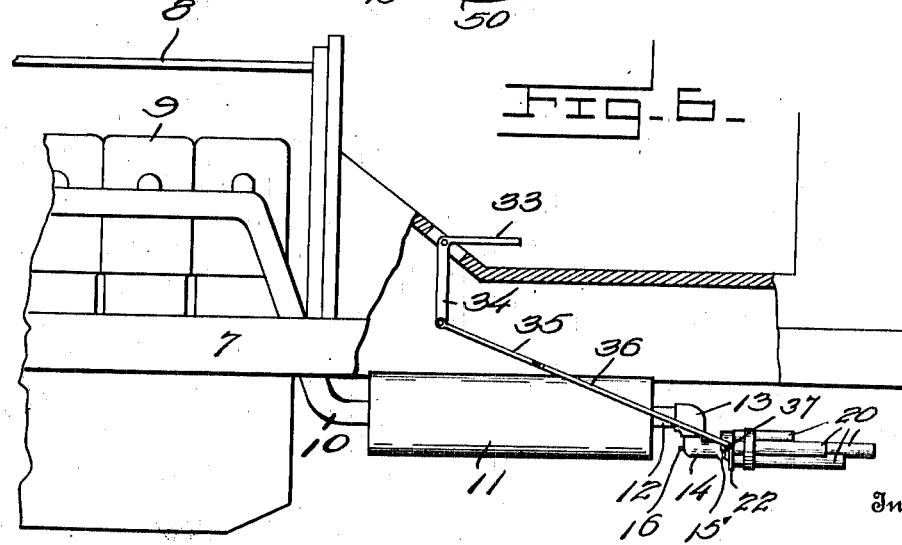

UNITED STATES PATENT OFFICE.

HENRY CHARLES EVELYN, OF CHICAGO, ILLINOIS, ASSIGNOR OF ONE-HALF TO MURREL A. KERN, OF WATSEKA, ILLINOIS.

AUTOMOBILE-HORN.

1,059,447. Specification of Letters Patent. Patented Apr. 22, 1913.

Application filed April 4, 1912. Serial No. 688,459.

*To all whom it may concern:*

Be it known that I, HENRY CHARLES EVELYN, a citizen of the United States, residing at Chicago, in the county of Cook and State of Illinois, have invented new and useful Improvements in Automobile-Horns, of which the following is a specification.

The present invention relates to horns or whistles and more particularly those operated by the exhaust from internal combustion engines, and the like, though it will be clear to those skilled in the art that it is not limited to this particular use.

The primary object of the present invention is to provide a simple, compact, and thoroughly practical structure that will either deliver the exhaust into the sound producing member or members, or into the open air, at the same time, constituting a protector for maintaining the parts substantially free from dirt and dust, thus making it especially applicable for use on automobiles and the like.

Two embodiments of the invention are illustrated in the accompanying drawings, but it is to be understood that said invention is not limited to the precise details of the two forms of construction disclosed.

In the drawings: Figure 1 is a side elevation of one embodiment of the invention. Fig. 2 is a longitudinal sectional view therethrough. Fig. 3 is a cross sectional view on the line 3—3 of Fig. 2. Fig. 4 is a view partially in elevation and partially in section of a modified form of construction. Fig. 5 is an end view of the valve member shown in Fig. 4. Fig. 6 is a view that is generally diagrammatic in its character, illustrating the application of the invention to the exhaust of an automobile motor or engine.

Similar reference numerals designate corresponding parts in all the figures of the drawings.

Referring first to Fig. 6, the frame of the automobile or vehicle is designated generally by the reference numeral 7, and mounted in the front portion thereof, beneath a hood 8, is an internal combustion engine 9 that may be of any desired or well known type. Leading from this engine, is an exhaust pipe 10 that conducts the exhaust to a muffler 11, and from one end of this muffler projects an exhaust pipe 12. An elbow 13 is suitably fixed to the exhaust pipe 12, and mounted on this elbow is a delivery member 14 that is also in the form of an elbow. The delivery member constitutes a part of the horn or whistle, and acts as a support for the remainder of the mechanism. It is secured to the elbow 13 preferably by a set screw 15, illustrated in Fig. 2, and the elbow 13 can of course be changed, in order that the device can be mounted on mufflers having discharge pipes of various diameters.

Referring first to the embodiment disclosed in Figs. 1, 2 and 3 respectively, it will be noted that the delivery member 14 has an open discharge end 15, extending through the lower portion of said delivery member, and projecting axially and horizontally through the discharge end thereof, is a supporting rod 16. This rod is slidably mounted in a boss 17 formed on the rear portion of the member 14. It is furthermore provided with a longitudinally disposed keyway or groove 18. A set screw 19, threaded into the boss, has its inner end engaged in the key-way, and firmly clamps the rod 16 in its adjusted position, while preventing the turning of the same, even when the set screw is loosened.

Mounted on the projecting end of the supporting rod 16 and clustered about the same, are a plurality of sound-producing elements, in the form of hollow cylinders 20 of different lengths. These cylinders have open receiving ends 21 spaced apart and arranged in opposition to the open discharge end 15 of the delivery member 14. Their opposite ends are closed. They are suitably secured to the rod 16 by webs or other devices 21ª, and their open ends are suitably formed to produce whistles, as will be readily understood. This group of sound-producing elements can of course be adjusted toward and from the delivery member 14 by loosening the screw 17, inasmuch as this will permit the sliding movement of the rod, as above explained.

Interposed between the delivery member 14 and the sound-producing members, is a controlling element, in the form of a valve 22, which valve is provided with a central opening that slidably receives the rod 16, so that said valve is movably mounted on the rod. It is furthermore provided with a lug or key 23 that is slidably engaged in the key-way or groove 18. The valve 22 is provided with a shield 24 that slidably extends over the upper part of the delivery member 14, and it also has a plurality of shields or guard lips 25 that slidably move alongside the inner ends of the sound producing members 20. Referring now more particularly to Fig. 2, it will be observed that the inner wall of the discharge end of the delivery member 14 is provided with a plurality of outwardly extending grooves 26, and the valve has ports 27 therethrough that terminate in grooves 28, which coact with the grooves 26, to produce directing nozzles when the valve 22 is against the end of the delivery member 14. In order to produce a practically tight joint, when in this latter position, the delivery member terminates in an annular rib 29, and the opposing face of the valve has a corresponding groove 30. A packing gasket 31 of asbestos or the like is preferably located in the latter. The said valve 22 is movable from the position shown in Fig. 2 to a position against the open ends of the sound-producing members 20, and is normally held in this latter position by means of a coiled spring 32 surrounding the rod 16, and suitably secured thereto and also secured to the valve. When in this position, it will be evident that the inlet ends of the sound producing cylinders will be substantially closed. In order to move the valve to the position shown in Figs. 1 and 2, suitable devices under the control of the operator of the machine, are employed. Thus in Fig. 6, there is illustrated a pedal 33, having a depending arm 34, to which is connected a link 35. This link terminates in a yoke 36 that is pivoted, as illustrated at 37, to the valve element.

Briefly described, the operation of the structure is as follows: Under normal conditions, or when there is no pressure upon the pedal 33, the spring 32 will hold the valve over the open inlet ends of the sound producing tubes 20, as illustrated in Fig. 6. The exhaust from the engine can thereupon escape into the open air, and in fact will be deflected from the tubes 20. When it is desired to sound an alarm, the operator has only to press upon the pedal 33, whereupon the spring 32 will be moved to the position shown in Figs. 1 and 2. When in this position, the exhaust will be directed through the ports 27 into the sound producing tubes 20, and sounds will thus be emitted. Upon releasing the pedal 33, the spring 32 will react to draw the valve member back to its position.

It will be evident that this structure is exceedingly simple, and is entirely practical. It permits the necessary adjustment of the parts to secure various tones and proper coaction. At the same time, inasmuch as the valve member is normally over the open ends of the tubes, dirt and dust will not find ready access into the latter.

Another embodiment of the invention is illustrated in Figs. 4 and 5, and in some respects, this form of structure is considered preferable. The delivery member is illustrated at 38, and adjustably mounted thereon is the supporting rod 39 carrying the sound producing tubes or members 40. The valve or controlling element is shown at 41, and is provided with the shield 42 and the guard lips 43. In this instance, it will be noted that the said lips 43, instead of being made integral with the valve, are carried by a stem 44 threaded into the valve. A guide screw 46 that extends through the parts, engages in the key-way 47, to prevent the relative rotation of the parts, and also serves as a lock to hold the valve and stem against relative movement. A spring 48, mounted on the rod is secured to the valve, and normally holds the same against the open ends of the tubes 40. The yoke for moving the said valve against the action of the spring, is shown at 49. In this embodiment of the invention, it will also be noted that the said valve element carries a plurality of delivery nozzles 50 that serve to direct the exhaust properly into the sound producing tubes. It is believed that this embodiment of the invention will be entirely clear from what has been described above.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:

1. In a device of the character set forth, the combination with a delivery member having an open discharge end, of a sound producing member having an open receiving end spaced from the discharge end, and a valve element movable between the members and having its opposite sides arranged to abut thereagainst to substantially close either.

2. In a device of the character set forth, the combination with a delivery member having an open discharge end, of a sound producing member having an open receiving end spaced from the discharge end, and a valve element movable between the members and having its opposite sides arranged to abut thereagainst to substantially close either, said valve element having means for delivering a sound producing fluid into the sound producing member when the said valve element is against the delivery member.

3. In a device of the character set forth, the combination with a delivery member having an open discharge end, of a sound producing member having an open receiving end spaced from the discharge end, and a valve element movable between the members and having its opposite sides arranged to abut thereagainst to substantially close either, and means for yieldingly maintaining the valve element against the end of the sound producing member.

4. In a device of the character set forth, the combination with a delivery member having an open discharge end, of a sound producing member having an open receiving end spaced from the discharge end, and a valve element movable between the said ends of the members, said element having a dirt shield that moves with it outside one of the members.

5. In a device of the character set forth, the combination with a delivery member having an open discharge end, of a sound producing member having an open receiving end spaced from the discharge end, and a valve element movable between the ends of the members and having a dirt shield that moves over the wall of the delivery member and bridges the space between said member and element.

6. In a device of the character set forth, the combination with a delivery member having an open discharge end, of a sound producing member having an open receiving end spaced from the discharge end, and a valve element movable between the ends of the members and having a shield that moves alongside the wall of the sound producing member and bridges the space between said member and element.

7. In a device of the character set forth, the combination with a delivery member having an open discharge end, of a sound producing member having an open receiving end, spaced from the discharge end, and a valve element movable between the ends of the members and having oppositely extending shields that respectively move alongside the delivery and sound producing members.

8. In a device of the character set forth, the combination with a delivery member having a discharge end, of a support projecting therefrom, a sound producing member carried by the support and having a receiving end spaced from the discharge end of the delivery member, and a controlling member movably mounted on the portion of the support between the delivery and sound producing members, said controlling member operating between the two adjacent ends of the members.

9. In a device of the character set forth, the combination with a delivery member having a discharge end, of a supporting rod projecting therefrom, a sound producing member mounted on the supporting rod and having a receiving end spaced from the discharge end of the delivery member, and a controlling member slidably mounted on the rod between the adjacent ends of the two members.

10. In a device of the character set forth, the combination with a delivery member having a discharge end, of a support projecting therefrom, a sound producing member mounted on the support and having a receiving end spaced from the discharge end of the delivery member, one of said members and the support being relatively adjustable to permit a change of distance between the adjacent ends of the two members, and a controlling member movably mounted on the support between the adjacent ends of the members.

11. In a device of the character set forth, the combination with a delivery member having a discharge end, of a supporting rod projecting therefrom, a sound producing member mounted on the supporting rod and having its inlet end in opposition to the discharge end of the delivery member, said rod being slidable on one of the members to change the distance between said members, means for holding the rod in fixed adjusted position, and a controlling member slidably mounted on the rod between the two members.

12. In a device of the character set forth, the combination with a delivery member having a discharge end, of a supporting rod projecting concentrically from the delivery member and slidably mounted thereon, means for holding the rod against movement, a sound producing member mounted on the rod and having a receiving end in opposition to the discharge end of the delivery member, a valve element slidably mounted on the rod between the two members and arranged to close the ends thereof, a spring for normally holding the valve member over the discharge end of the sound-producing member, and means for moving said valve element against the action of the spring.

13. In a device of the character set forth, the combination with a single delivery member having a discharge end, of a plurality of sound-producing members having their receiving ends in opposition to the discharge end of the delivery member, and a controlling valve element movable to one position to substantially close all the sound-producing members and to a different position, said valve element having a plurality of fluid-directing portions that direct fluid from the discharge end of the delivery member simultaneously into the receiving ends of the sound producing members when the element is in said different position.

14. In a device of the character set forth, the combination with a delivery member having a discharge end, of a support projecting therefrom, a plurality of sound producing elements having open receiving ends disposed in opposition to the discharge end of the delivery member, and a valve member slidable upon the support and movable to a position across the open ends of the sound producing members and to a position across the end of the delivery member, said valve element having means for directing fluid from the delivery member into the sound producing members when located across the former.

15. In a device of the character set forth, the combination with a delivery member having an open discharge end, of a supporting rod projecting axially therefrom, a plurality of sound producing members clustered around the projecting end of the supporting rod and having open ends opposed to the open end of the delivery member, a valve element slidably mounted on the rod between the delivery member and the sound producing members and arranged to abut against the open ends thereof, said valve having means for directing fluid from the delivery member into the various sound producing members, a spring for normally holding the valve against the end of the sound-producing member, and means for moving said valve away from said normal position.

In testimony whereof I have hereunto set my hand in presence of two subscribing witnesses.

HENRY CHARLES EVELYN.

Witnesses:
V. W. HARMON,
C. V. YELTON.